P. MUELLER.
NIPPLE AND ASSEMBLY FOR ATTACHING NIPPLES.
APPLICATION FILED MAY 5, 1913.
1,124,504.
Patented Jan. 12, 1915.
2 SHEETS—SHEET 1.
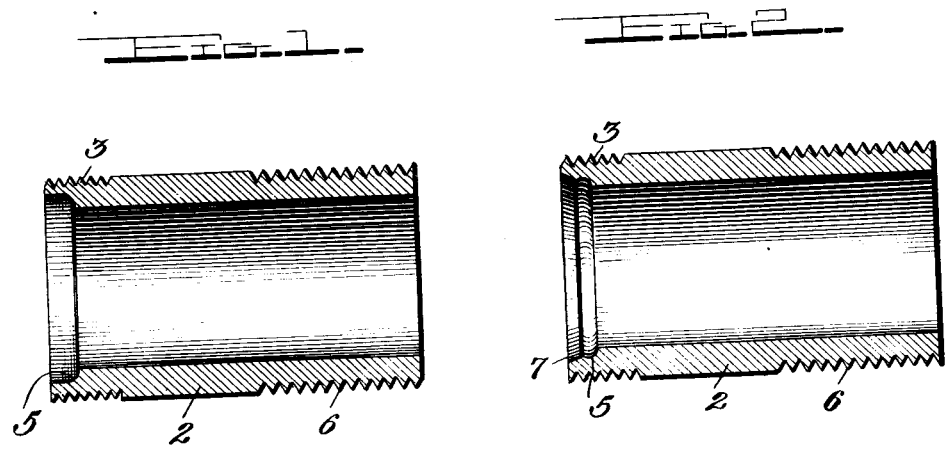
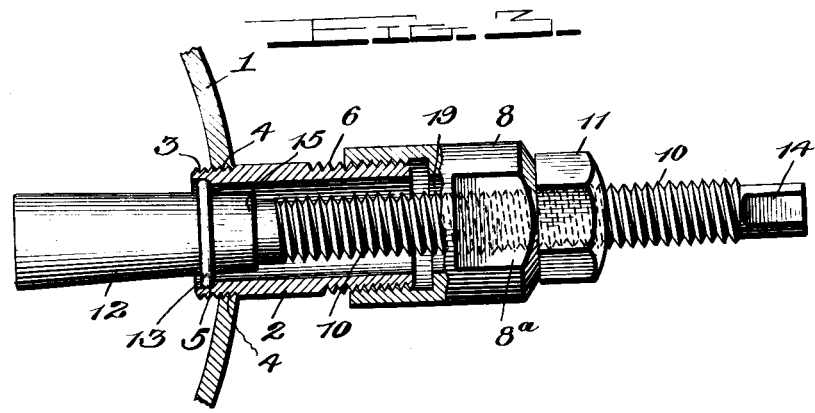
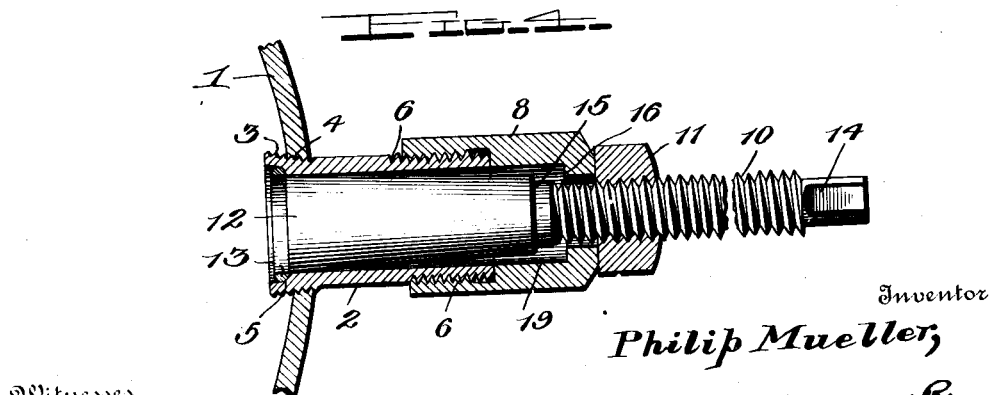
Inventor
Philip Mueller,
By Meyers, Cushman & Rea
Attorneys
Witnesses
Chas. L. Griesbauer.
C. H. Fesler

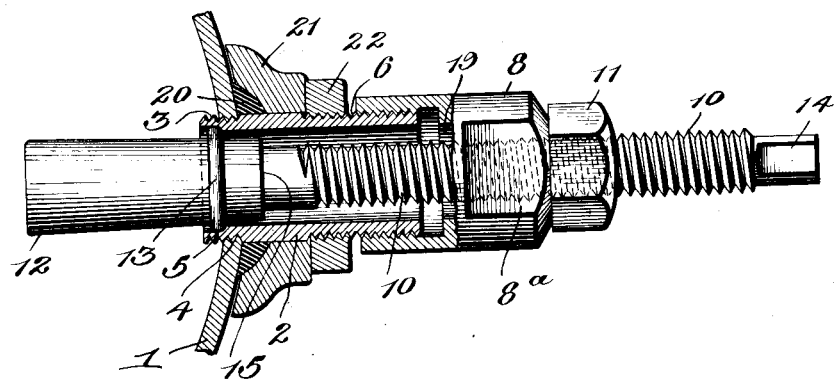

UNITED STATES PATENT OFFICE.

PHILIP MUELLER, OF DECATUR, ILLINOIS, ASSIGNOR TO H. MUELLER MFG. CO., OF DECATUR, ILLINOIS, A CORPORATION OF ILLINOIS.

NIPPLE AND ASSEMBLY FOR ATTACHING NIPPLES.

1,124,504.     Specification of Letters Patent.     Patented Jan. 12, 1915.

Application filed May 5, 1913. Serial No. 765,599.

*To all whom it may concern:*

Be it known that I, PHILIP MUELLER, a citizen of the United States, residing at Decatur, in the county of Macon and State of Illinois, have invented new and useful Improvements in Nipples and Assembly for Attaching Nipples, of which the following is a specification.

This invention relates to improvements in pipe fittings, and in a correlative arrangement of a fitting and means for anchoring the same in a pipe or the like.

The invention is designed chiefly to provide a nipple and a means of securely anchoring the same in a pipe or other article, the wall of which is so thin that it does not afford sufficient mass for ordinary screw-threaded connection of the nipple therewith, but is not restricted to the anchoring of nipples, as it is useful in the attachment of cocks and various fittings to pipes, all of which are included in the following description under the generic term fitting.

With these objects in view, the invention consists in a pipe fitting itself and the fitting attaching assembly, as hereinafter described and claimed, reference being had to the accompanying drawing for purposes of illustration of the nature of the invention.

In the said drawing,—Figure 1 is a sectional view of the new fitting, specifically a nipple. Fig. 2 is a similar view illustrating a modification. Fig. 3 is an assembly view, partly in section and partly in side view, showing the position of the parts immediately preparatory to anchoring the nipple. Fig. 4 is a sectional view illustrating the position of the parts after the nipple has been anchored. Fig. 5, a view similar to Fig. 3, means for insuring a water-tight connection with the pipe.

In the drawing as illustrative of the distinguishing characteristics of the invention it is shown embodied in a nipple and nipple-attaching means and that plan for convenience is adopted in the following description, the term "nipple" including, unless otherwise expressed, a fitting generally, in the sense above explained.

In the said drawing, the reference numeral 1 designates a fractional view in section of the wall of a pipe or other article, for instance, what is known in the trade as a calamine pipe, the wall of which is of such thinness that it does not afford sufficient mass for ordinary screw-threaded connection of a nipple thereto. 2 designates the nipple which at its end that is to be secured or anchored, for example, in the pipe 1 is provided with screw threads 3 to engage similar threads 4 in the nipple-opening of the pipe, and at this end (which it will be observed by reference to Fig. 1 of the drawing is non-deflected; that is to say, this end has not been deflected as it is when the nipple has been anchored in place, as shown in Fig. 4 of the drawing) the nipple is provided with an expanding ring seat 5 formed in the inner wall thereof, the provision of which reduces the thickness of the wall of the nipple at said ring seat. The opposite end of the nipple is provided with screw threads 6 for the convenient, usual attachment of a water service fitting, for example, and for the incorporation of the nipple into the hereinafter described assembly appliances. In the modified form of nipple illustrated in Fig. 2, the mouth 7 of the ring seat 5 is slightly flared to lead the ring easily to its seat.

What is termed, for convenience, the nipple assembly consists of a sleeve 8 screw-threaded for engagement with the threads 6 of the nipple 2 and having a bore 9 through which loosely passes the threaded stem 10 of a ring expanding tool. The numeral 11 designates the expanding-tool manipulator, shown as a nut, in screw threaded engagement with the threads 10 of the tool. The active or expanding end 12 of the tool is a wedge or expanding tool that carries a ring 13 through the eye of which the tool is threaded or drawn, or, in other words, the ring is loosely strung. The opposite end of the tool is fashioned for coöperation with a holding implement by which rotation of the tool is prevented during the operation of anchoring the nipple. As shown, it is provided with suitable wrench grips 14 by which it may be held from such rotation through the medium of a wrench.

The preferable procedure of making up the nipple assembly is as follows, and this preferred procedure is stated by way of example merely and not as restrictive. Assuming that the opening in the wall of the pipe or the like in which the nipple is to be anchored has been drilled and tapped, the expansible ring 13 is slipped or strung on the wedge end of the expanding-tool as far as it may be moved thereon manually. The tool is then passed through the nipple 2 until the ring 13 rests in the seat 5, or in respect of the modified form of nipple shown in Fig. 2, until the ring enters the flared mouth 7 of the seat 5; the sleeve 8 is then slipped over the threaded stem 10 of the tool and engaged with the threaded end 6 of the nipple, after which the tool manipulator or nut 11 is threaded onto the stem of the tool until it engages the sleeve 8. In this condition, it will be observed that there is a complete organization of parts, the ties which hold the several parts in this assembled relation being the ring 13 in engagement with its seat in the nipple and the tool manipulator or nut 11 which is in screw-threaded engagement with the stem 10 of the tool, so that there is no possibility of the nipple or tool being unintentionally or accidentally separated from the unitary organization. Thus it will be seen that in the act of anchoring the nipple there is no possibility of the tool or the ring becoming separated and dropping into the water main if that be the article to which the nipple is to be fitted.

The nipple assembly or organization having been thus described, the operation of anchoring the nipple is simple and effective. It may be stated as follows: The wedge end of the tool is inserted through the opening in which the nipple is to be anchored and the nipple then screwed approximately into place manually, after which by a suitable implement, such as a wrench, applied to the sleeve 8, which may be provided with appropriate wrench grips 8ª, the nipple is screwed tightly into place. Thereupon the tool manipulator, shown as a nut, is rotated by a wrench, for example, and acts to draw the tool outwardly through the nipple and sleeve, rotation of the tool being prevented during this operation, preferably manually, by holding it with a wrench engaging the end 14 of the tool. As the tool is thus drawn it exerts a wedge action upon the expansible ring 13, which, in turn, operating against the end of the nipple which projects beyond the wall of the pipe or the like, expands this end of the nipple, as illustrated in Fig. 4 of the drawing, thus securely anchoring the nipple. Continued rotation of the tool manipulator draws the wedge end of the tool clear through the ring, as shown in said Fig. 4. The expanded ring will be retained within the end of the fitting by friction, the pressure necessary to expand said ring and the end of the fitting being sufficient to press the two into intimate and forcible contact. The completion of this operation of anchoring the nipple may be indicated to the operator in any suitable way, if desired, by a suitable indicator with which the tool may be provided and the appearance of which as it merges from the tool manipulator or nut 11 will indicate the completion of the operation, but such an indicator is not essential as the operator can determine the completion of the operation by the fact that when it has been completed the nut rotates more easily than when movement of the tool is resisted by the ring 13. And, finally, this may be indicated to the operator by providing a shoulder 15 upon the tool which comes into engagement with a counterpart shoulder 16 of the sleeve 8. The sleeve 8 may then be disconnected from its engagement with the nipple 2 and withdrawn, and, of course, in so doing the tool and nut 11 will also be withdrawn from the nipple.

The thinning of the wall of the ring receiving end of the nipple facilitates the expansion above described, since it reduces the thickness of the wall at that point.

When it is desired, as may frequently be the case, to provide or insure a water-tight joint between the nipple and the pipe a gasket 20 may be slipped upon the nipple as shown in Fig. 5, a saddle 21 being adjustably arranged on said nipple to compress the gasket and a lock-nut 22 provided for pressing the saddle against the gasket and holding the same in adjusted position.

Having thus described my invention, what I claim is:—

1. A tubular fitting of uniform exterior diameter throughout its length, screw threaded on one end for engagement into and through a support, and provided with an interior annular ring-seat coincident with such end and being located wholly within the support.

2. A tubular fitting of uniform exterior diameter throughout its length having a screw threaded end for engagement into and through a support, and having an interior annular flaring-mouth ring-seat coincident with such end beyond the support.

3. A tubular fitting of uniform exterior diameter throughout its length having screw threads on one end for engagement into a support, and having an interior annular ring-seat at said end located wholly within the support and formed by reducing from within the thickness of the end wall of the fitting.

4. A tubular fitting of uniform exterior diameter adapted for insertion at one end into and beyond a support, and an anchoring ring wedged into said end of the fitting beyond the support whereby to hold said end of the fitting in expanded position and retain the fitting in the support.

5. An apparatus for expanding a fitting having at one end a ring-seat, said apparatus comprising a sleeve adapted to be threaded on said fitting, a ring-expanding tool, the expanding end of which is a wedge, a ring adapted to be seated in the ring seat of said fitting, and a threaded stem passing freely through the fitting and sleeve, and a tool manipulator threaded on said stem.

6. An apparatus for expanding a fitting having at one end a ring-seat, said apparatus comprising a ring-expanding tool, the expanding end of which is a wedge, its other end comprising a threaded stem adapted to pass through said fitting, a ring on said wedge to enter and be expanded in said ring-seat, and a tool manipulator threaded on said stem.

7. In combination a wedge anchoring tool carrying an expanding ring adapted to enter a ring seat in one end of a fitting and expand the same, and means for operating said tool to expand said ring and through said ring the end of the fitting.

8. An apparatus for expanding a fitting having at one end a ring-seat with thinner walls than the rest of said fitting, said apparatus comprising a ring-expanding tool carrying a ring adapted to be seated in the ring seat of said fitting, a gasket arranged to surround said fitting, means adapted to be carried by said fitting for compressing said gasket, and means for manipulating said ring-expanding tool.

9. An apparatus for securing a fitting in place having at one end a ring-seat formed by reducing the thickness of the walls of said fitting, said apparatus including a ring-expanding tool carrying a ring designed to enter the ring seat in said fitting, a gasket arranged to surround said fitting, a saddle adapted to bear on said gasket, and means for engaging and moving said saddle to compress said gasket.

10. An apparatus for anchoring an exteriorly threaded fitting screwed at one end into a support and having a bore enlarged at its inserted end to form a seat, said apparatus comprising an expanding tool adapted to be inserted within said bore formed of a threaded stem terminating at one end in an outwardly tapering head, an expansible ring for loose mounting on the smaller inner end of said head to enter said seat when the tool is inserted in the fitting, a sleeve slidable on the threaded stem formed with an internal thread to screw on the projecting end of the fitting, and a manipulator threaded on said stem which on being revolved bears on said sleeve and, drawing the expanding tool through the ring and nipple, expands the ring and by means of the ring expands the inner end of the nipple.

11. An apparatus for anchoring a fitting in a support comprising an expanding tool in the form of a threaded stem terminating at one end in a relatively long outwardly tapering head, a sleeve slidable on said stem, and a manipulator threaded on the stem to bear against said sleeve when the apparatus is in place and move the tool longitudinally, said apparatus to be supported wholly by the fitting to be anchored, and an expansible ring for loose mounting on the sleeve and on the smaller end of the tapered head adapted to enter a seat in the end of said fitting to be anchored and expanded as the tool moves longitudinally, expanding in turn the end of the fitting.

12. The herein described method of anchoring a fitting in a support, the same consisting of screwing one end of the fitting having a seat therein into the support until said end projects a short distance beyond said support, inserting through said fitting a longitudinally movable expanding tool having a tapering head upon which is loosely placed an expansible ring, seating said ring in said seat, and then by suitable means drawing said tool longitudinally through the fitting to expand the ring and through the expansion of the ring spread the projecting end of said fitting.

13. The herein described method of expanding a fitting in a support, the same consisting in screwing one end of the fitting having a seat therein with walls of reduced thickness into the support, inserting an expansible ring in said seat, and drawing through said ring a tool capable of expanding the same and through the expansion of said ring expand the reduced end of the fitting.

In testimony whereof I have hereunto set my hand in presence of two subscribing witnesses.

PHILIP MUELLER.

Witnesses:
LEONARD F. McKIBBEN,
CATHERINE E. McKEOWN.

Correction in Letters Patent No. 1,124,504.

It is hereby certified that in Letters Patent No. 1,124,504, granted January 12, 1915, upon the application of Philip Mueller, of Decatur, Illinois, for an improvement in "Nipples and Assembly for Attaching Nipples," an error appears in the printed specification requiring correction as follows: Page 3, line 68, for the word "on" read *in;* and that the said Letters Patent should be read with this correction therein that the same may conform to the record of the case in the Patent Office.

Signed and sealed this 9th day of February, A. D., 1915.

[SEAL.]

J. T. NEWTON,
*Acting Commissioner of Patents.*